United States Patent
Dyer et al.

(10) Patent No.: US 6,326,550 B1
(45) Date of Patent: Dec. 4, 2001

(54) CABLE SEAL

(75) Inventors: Dennis Paul Dyer, Pleasant Garden; Alan David Tysinger, Lexington; Paul Joseph Elliot, Greensboro, all of NC (US)

(73) Assignee: General Dynamics Advanced Technology Systems, Inc., Greensboro, NC (US)

( * ) Notice: Subject to any disclaimer, the term of this patent is extended or adjusted under 35 U.S.C. 154(b) by 0 days.

(21) Appl. No.: 09/711,616

(22) Filed: Nov. 13, 2000

(51) Int. Cl.[7] .............................................. H02G 15/013
(52) U.S. Cl. ................................................. 174/93
(58) Field of Search ............................. 174/77 R, 93, 174/DIG. 8; 385/99, 139, 147; 439/882, 932

(56) References Cited

U.S. PATENT DOCUMENTS

| | | | |
|---|---|---|---|
| 4,303,304 | 12/1981 | Ruiz | 385/80 |
| 4,362,356 | 12/1982 | Williams et al. | 385/80 |
| 4,586,970 | 5/1986 | Ishise et al. | 156/48 |
| 4,603,942 | 8/1986 | Chang et al. | 385/100 |
| 4,606,603 | 8/1986 | Cairns | 385/58 |
| 4,616,900 | 10/1986 | Cairns | 385/80 |
| 4,682,848 | 7/1987 | Cairns et al. | 385/58 |
| 4,722,590 | 2/1988 | Thomas | 385/107 |
| 4,733,935 | 3/1988 | Gandy | 385/58 |
| 4,767,173 | 8/1988 | Priaroggia | 385/80 |
| 4,773,729 | 9/1988 | Mignien | 385/58 |
| 4,883,336 | 11/1989 | Bock et al. | 385/80 |
| 5,037,177 | 8/1991 | Brown et al. | 385/59 |
| 5,066,095 | 11/1991 | Dekeyser et al. | 385/99 |
| 5,082,338 | 1/1992 | Hodge | 385/81 |
| 5,183,966 * | 2/1993 | Hurtado et al. | 174/77 X |
| 5,217,808 | 6/1993 | Cobb | 428/392 |
| 5,222,176 | 6/1993 | Webber et al. | 385/99 |
| 5,241,618 | 8/1993 | Gould | 385/139 |
| 5,261,018 | 11/1993 | Suganuma et al. | 385/51 |
| 5,283,849 | 2/1994 | Cooke et al. | 385/77 |
| 5,418,876 | 5/1995 | Lee | 385/80 |
| 5,460,549 | 10/1995 | Muzslay | 439/733.1 |
| 5,469,521 | 11/1995 | Coutts et al. | 385/77 |
| 5,567,174 | 10/1996 | Ericson, Jr. et al. | 439/462 |
| 5,661,842 | 8/1997 | Faust | 385/139 |
| 5,675,120 | 10/1997 | Craft et al. | 174/52.1 |
| 5,734,767 | 3/1998 | Belt | 385/51 |
| 5,738,535 | 4/1998 | Cairns | 404/6 |
| 5,752,852 | 5/1998 | Onoda | 439/559 |
| 5,798,910 | 8/1998 | Holbeche et al. | 361/809 |
| 5,838,861 | 11/1998 | Bunde | 385/100 |
| 5,873,750 | 2/1999 | Cairns et al. | 439/587 |
| 5,899,765 | 5/1999 | Niekrasz et al. | 439/201 |
| 5,903,693 | 5/1999 | Brown | 385/100 |
| 5,943,462 | 8/1999 | Schofield et al. | 385/100 |

* cited by examiner

*Primary Examiner*—Chau N. Nguyen
(74) *Attorney, Agent, or Firm*—Moore & Van Allen PLLC; Michael G. Johnston

(57) ABSTRACT

A cable seal and method for sealing a cable termination is provided for sealing the passage of a cable into a cable-receiving structure. The seal includes a first plurality of o-rings disposed along a length of the cable adjacent the cable-receiving structure and a first length of heat-shrinkable tube which fits over the cable and o-rings for compressive engagement with the cable and o-rings to prevent moisture penetration between an inner surface of the first tube and the outer surface of the cable. A second plurality of o-rings is disposed over the first heat-shrinkable tube adjacent the first plurality of o-rings. A second length of heat-shrinkable tube fits over the second plurality of o-rings, the first heat-shrinkable tube, the first plurality of o-rings, the cable and a portion of the cable-receiving structure to prevent moisture penetration between an inner surface of the second tube and an outer surface of the cable-receiving structure and between the inner surface of the second tube and the outer surface of the cable.

6 Claims, 8 Drawing Sheets

CABLE SEAL

BACKGROUND

This invention relates generally to a cable seal, and more particularly to a cable seal for a pressure vessel assembly for housing electronic components in an underwater environment.

Underwater communication systems provide signal transmission between, or to, land-based positions. A typical system generally comprises a cable for signal transmission and one or more housings containing electrical components which are spaced along the cable between the land-based positions. The signal cable has a core which may include electrical conductors, fiber optic cable, or other signal transmission elements surrounded by a protective jacket. Metal strength members are disposed about the core of the cable between the cable core and the outer surface of the jacket. The strength members bear the tensile and compressive loads placed on the cable while in operation. The cable may carry various signals, including low voltage signals such as information and data signals, higher voltage signals for providing electrical power, or other types of signals.

The housings for the electronic components are referred to as pressure vessels. A pressure vessel is typically a cylindrical tube with open ends capped by circular bulkheads. The signal cable is terminated adjacent to each of the bulkheads in a termination assembly. The termination assemblies are secured to the bulkheads and provide mechanical continuity between the cable ends and the pressure vessel while relieving the stress on the signal transmission elements of the cable. The signal transmission elements pass into the pressure vessel through seals in the bulkheads for connection to the electronic components in the pressure vessel.

The pressure vessel assembly must protect the electronic components, signal cable and their connections from exposure to water at depths of up to 20,000 feet and pressures of up to 10,000 pounds per square inch for periods of up to 25 years. This harsh environment contributes to problems related to the performance reliability and product life of pressure vessel assemblies.

Conventional solutions to the problems of designing reliable and durable pressure vessel assemblies are plagued by high cost. The present practice is to use pressure vessels formed from beryllium-copper or titanium with polyethylene or gland cable seals and polyethylene-overmolded cable termination assemblies. Beryllium-copper or titanium is used for the pressure vessel because of their excellent resistance to corrosion in underwater applications. However, this material is very expensive, and machining is difficult. The polyehtylene or gland cable seals are expensive, consist of numerous parts, and are difficult and time-consuming to install. In addition to the seals, a water block of some sort must be used to prevent water ingress in the event of a cable cut.

The termination assemblies are overmolded with polyethylene to prevent water from accessing the internal portions of the signal cable and pressure vessel. In the overmolding process, high density polyethylene is molded around the cable termination assembly thereby sealing the areas between the outer surface of the cable jacket and the termination assembly. In some cases, portions of the cable and the pressure vessel are also overmolded with polyethylene. However, polyethylene overmolding is not cost effective in most applications because the required molding equipment is expensive and the process time consuming thereby restricting production rates. Moreover, the overmolding is a difficult process, requiring a high operator skill level and has yield and reliability problems.

For the foregoing reasons, there is a need for a reliable, long life, low cost pressure vessel assembly for housing electrical components in underwater communication systems. The new pressure vessel assembly must be capable of withstanding deep underwater pressures for many years. Seals for the passage of the signal cable transmission elements into the pressure vessel should be easy to install and effectively prevent moisture penetration. The termination assembly sealing process should be fast and simple to perform, requiring minimal operator skill level. Moreover, the components for sealing the cable termination assembly should be adaptable to seal various cable termination assembly types.

SUMMARY

Therefore, it is an object of the present invention to provide a low cost underwater pressure vessel assembly which is readily and economically produced for use in underwater communications systems.

A further object of the present invention is to provide moisture protection to the electronic components in the pressure vessel. A related object is to provide a simple, effective seal for the signal transmission elements passage into the pressure vessel.

A still further object of the present invention is to provide a seal and method for readily and simply sealing a cable termination assembly for use in connecting signal cable to the pressure vessel. The termination assembly seal and method should allow for adaptability to various cable types.

Another object of the present invention is to provide a pressure vessel assembly which is reliable and durable enough for an extended useful life submerged in the underwater environment.

According to the present invention, a pressure vessel is provided for housing electronic components in an underwater environment and permitting connection of the components to signal transmission elements of a signal cable. The pressure vessel comprises a hollow steel shell defining an interior chamber adapted to house the electronic components. A layer of thermal-sprayed aluminum covers the shell. The shell has an opening adapted to pass the signal transmission elements into the interior chamber. A seal adapted to sealingly surround the transmission elements is disposed in the opening in the shell so that an outer peripheral surface of the seal contacts an inner peripheral surface of the opening in the shell for preventing moisture penetration into the interior chamber. The seal may be formed of epoxy and the outer peripheral surface have a plurality of compressible o-rings disposed in axially-spaced circumferential grooves for contacting the inner peripheral surface of the opening in the shell.

Also according to the present invention, an underwater telecommunication system is provided comprising electronic components and a hollow steel shell for housing the electronic components. The shell is covered by a layer of thermal-sprayed aluminum. A signal cable is mechanically connected to the shell in watertight relation. The signal cable includes at least one transmission element and the shell has an opening for passing the transmission element into the interior chamber for connecting the transmission element to the electronic components for signal transmission. A seal surrounding the transmission element is disposed in the opening in the shell for preventing moisture penetration into the shell.

According to another aspect of the present invention, a cable seal is provided for sealing the passage of a cable into a cable-receiving structure. The seal comprises a first plurality of o-rings disposed along a length of the cable adjacent the cable-receiving structure and a first length of heat-shrinkable tube which fits over the cable and o-rings for compressive engagement with the cable and o-rings when the first tube is heated to prevent moisture penetration between an inner surface of the first tube and the outer surface of the cable. A second plurality of o-rings is disposed over the first heat-shrinkable tube adjacent the first plurality of o-rings. A second length of heat-shrinkable tube fits over the second plurality of o-rings, the first heat-shrinkable tube, the first plurality of o-rings, the cable and a portion of the cable-receiving structure for compressive engagement with the second plurality of o-rings, the first heat-shrinkable tube, the first plurality of o-rings, the cable and the portion of the cable-receiving structure when heated to prevent moisture penetration between an inner surface of the second tube and an outer surface of the cable-receiving structure and between the inner surface of the second tube and the outer surface of the cable.

According to a still further aspect of the present invention, a sealed cable end assembly comprises a structure having a through passage for receiving a cable end and means for preventing relative axial movement of the structure and cable. A first plurality of o-rings is disposed along a length of the cable adjacent the cable-receiving structure. A first length of heat-shrinkable tube is positioned around the cable and o-rings for compressive engagement with the cable and o-rings when the first tube is heated to prevent moisture penetration between an inner surface of the first tube and the outer surface of the cable. A second plurality of o-rings is disposed over the first heat-shrinkable tube, the second plurality of o-rings positioned adjacent the first plurality of o-rings. A second length of heat-shrinkable tube fits over the second plurality of o-rings, the first heat-shrinkable tube, the first plurality of o-rings, the cable and a portion of the cable-receiving structure for compressive engagement with the second plurality of o-rings, the first heat-shrinkable tube, the first plurality of o-rings, the cable and the portion of the cable-receiving structure when heated to prevent moisture penetration between an inner surface of the second tube and an outer surface of the cable-receiving structure and between the inner surface of the second tube and the outer surface of the cable.

Also according to the present invention, a method is provided for sealing a cable termination including a cable end positioned in an opening of a cable-receiving structure for preventing relative axial movement of the cable end and structure. The sealing method comprises disposing a first plurality of o-rings along a length of the cable adjacent the cable-receiving structure and positioning a first length of heat-shrinkable tube around the cable and o-rings. The first heat-shrinkable tube is heated causing the tube to compressively engage the cable and o-rings to prevent moisture penetration between an inner surface of the first tube and the outer surface of the cable. A second plurality of o-rings is disposed around the first heat-shrinkable tube adjacent the first plurality of o-rings and a second length of heat-shrinkable tube is positioned around the second plurality of o-rings, the first heat-shrinkable tube, the first plurality of o-rings, the cable and a portion of the cable-receiving structure. The second heat-shrinkable tube is then heated causing the tube to compressively engage the second plurality of o-rings, the first heat-shrinkable tube, the first plurality of o-rings, the cable and the portion of the cable-receiving structure to prevent moisture penetration between an inner surface of the second tube and an outer surface of the portion of the structure and between a portion of the inner surface of the second tube and the outer surface of the cable.

The pressure vessel assembly of the present invention provides a low cost, structurally robust, reliable, and durable device for use in underwater communication systems. The thermal-sprayed aluminum coating of the steel pressure vessel provides a housing for the electronic components of the system which is resistant to corrosion, particularly galvanic corrosion in seawater. The two-layers of heat-shrinkable tubes over sets of o-rings function as multiple redundant seals for the cable termination assembly. The components of the pressure vessel assembly of the present invention are low cost and require minimal assembly expertise and time.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper", "lower", "left", "right", "horizontal", "vertical", "upward", "downward", "clockwise" and "counter-clockwise" merely describe the configuration shown in the figures. It is understood that the components may be oriented in any direction in the terminology, therefore, it should be understood as encompassing such variations unless specified otherwise.

Figure 1:
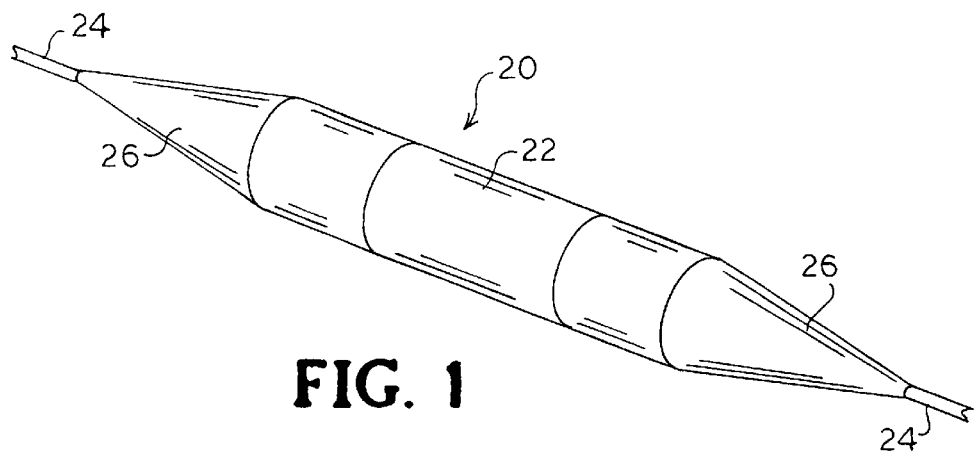
FIG. 1 is a perspective view of a pressure vessel assembly according to the present invention showing a portion of the cables extending from each end.

Referring now to the drawings wherein like reference numerals designate corresponding or similar elements throughout the several views, there is shown in FIG. 1 a pressure vessel assembly according to the present invention, generally designated at 20, for use in an underwater communication system. The pressure vessel assembly includes a pressure vessel 22, a signal cable 24, portions of which are shown extending from each end of the pressure vessel assembly 20, and a bend strain relief 26 surrounding the signal cable 24 at each end of the pressure vessel 22.

Figure 2:
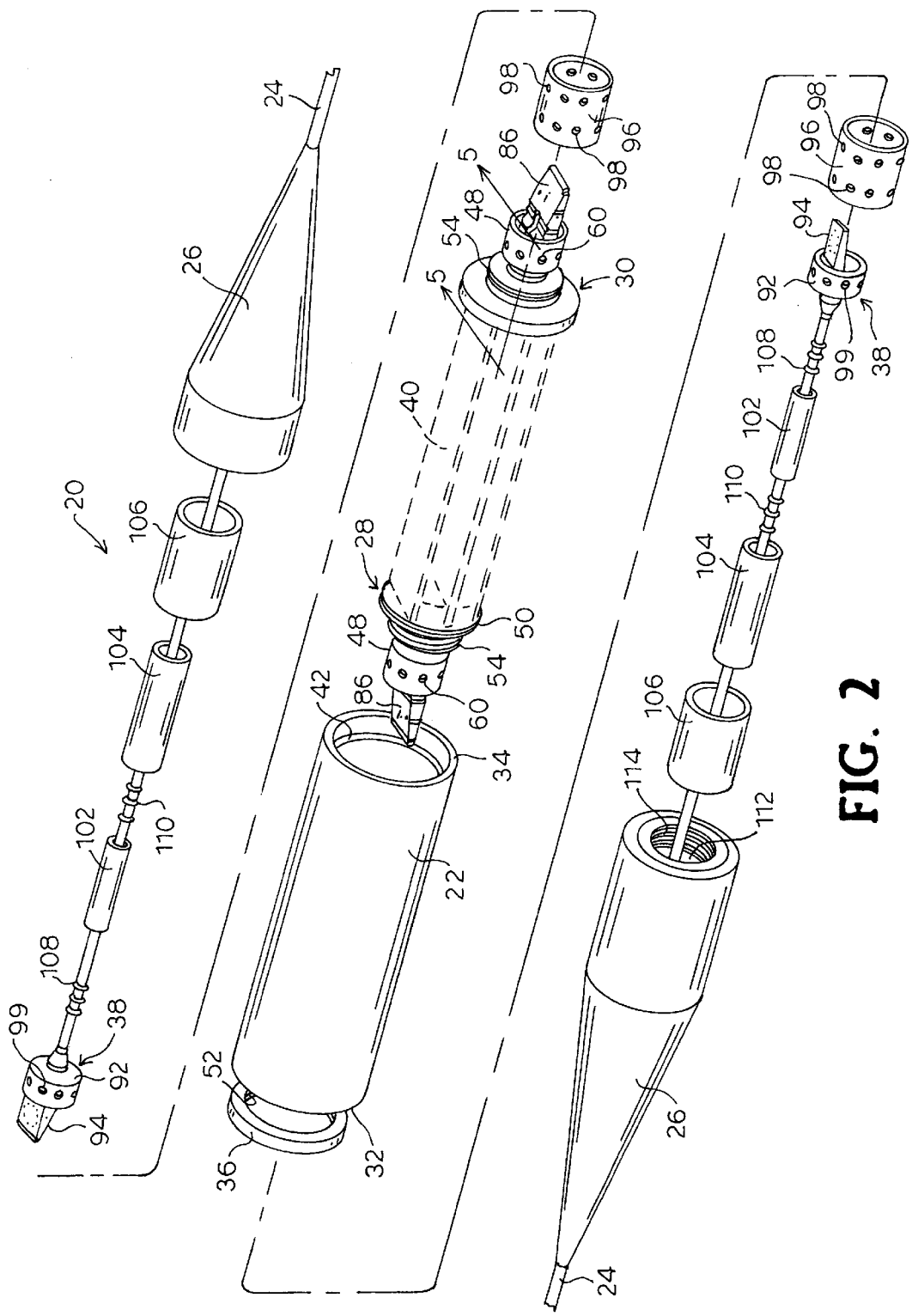
FIG. 2 is an exploded view of an electronics pressure vessel assembly as shown in FIG.1.

Other components of the pressure vessel assembly 20, are seen in the exploded view of FIG. 2, including bulkheads 28, 30 for sealing the ends 32, 34 of the pressure vessel 22 in cooperation with a lock ring 36, and termination assemblies 38 at each end of the signal cable 24.

The pressure vessel 22 is a hollow, cylindrical shell formed from carbon or stainless steel for housing a card cage assembly 40 (shown in phantom in FIG. 2) supporting card trays carying electronic components of the communications system. The pressure vessel 22 has an inner surface defining a cylindrical bore having annular seats on each end.

Figure 5:
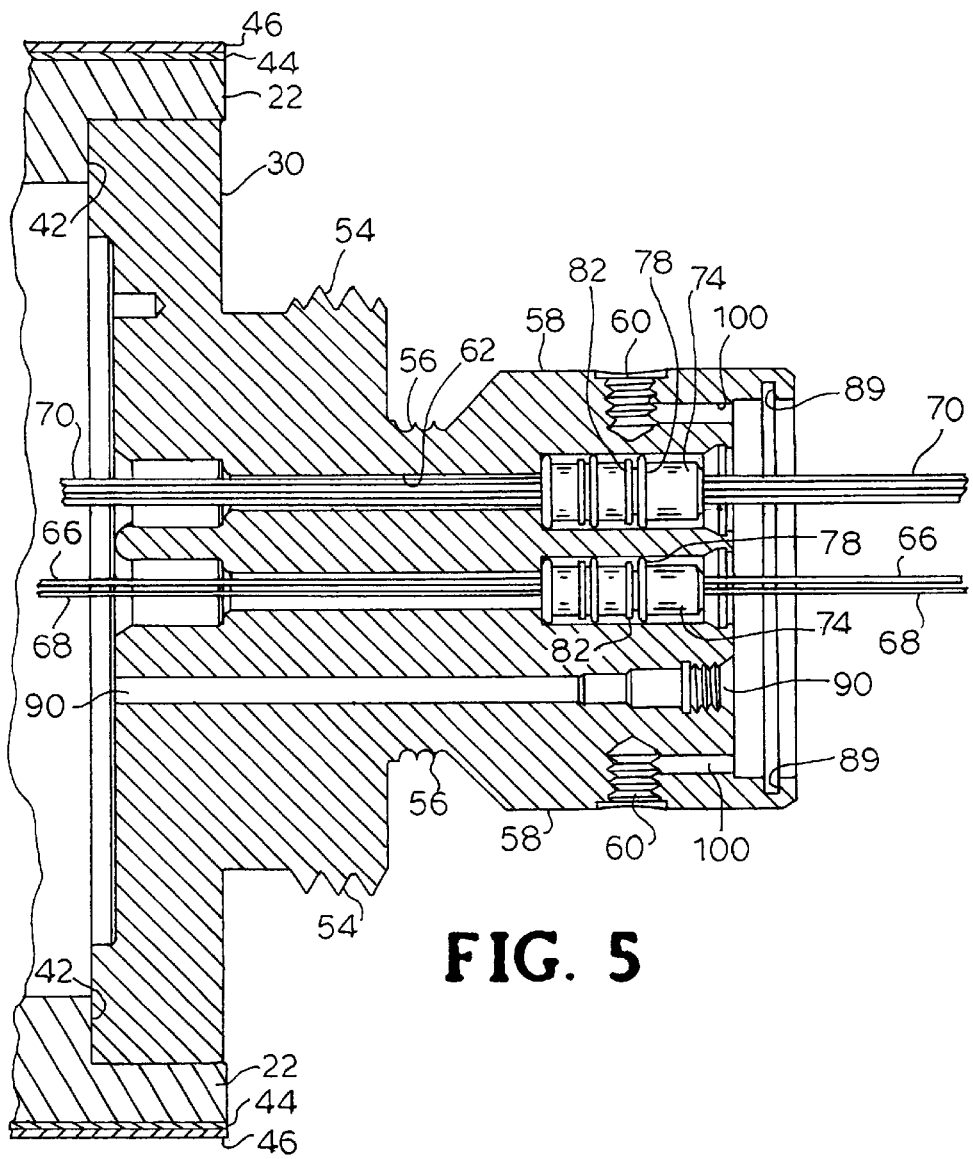
FIG. 5 is a partial cross-section of an electronics pressure vessel assembly taken along line 5—5 of FIG. 2.

The outer surface pressure vessel 22 is coated with a layer of aluminum 44 42 (FIG. 5). Preferably, the aluminum layer 44 is applied using a thermal spraying process. Thermal spraying is a process of depositing on substrate materials molten or semi-molten materials which solidify and bond to the substrate. The process is also called metallizing and flame or metal spraying. The spray materials may be in the form of wire, rod, or powder. As the materials pass through the spray unit, they are heated to a molten or semi-molten state and then projected onto the substrate. A coating of thermal-sprayed aluminum (TSA) has been shown to provide a 20-year life to steel structures in sea water splash zones. The TSA coating improves corrosion resistance by providing a "sacrificial" aluminum anode over components susceptible to corrosion in seawater. Thus, in the present invention, the TSA layer 44 will galvanically protect the carbon steel base material of the pressure vessel 22 thereby slowing the corrosion of the pressure vessel to a negligible level. Preferably, a layer of silicone aluminum sealer 46 is applied over the TSA layer 44 to further increase the life of the pressure vessel.

The bulkheads 28, 30 (FIG. 2) form the ends of the pressure vessel 22 and are preferably machined from the same grade of carbon steel as the pressure vessel. The bulkheads 28, 30 are generally circular in cross section with an outwardly extending central cylindrical coaxial portion 48. Each bulkhead 28, 30 is secured to the card cage assembly 40.

One of the bulkheads 28 has a cross section which is slightly less than the diameter of the inner cylindrical bore of the pressure vessel 22 for allowing insertion of the assembled bulkheads 28, 30 and card cage assembly 40 through one end of the pressure vessel. This smaller bulkhead 28 is externally threaded 50 for receiving the lock ring 36 which has an inner thread 52 for engaging the external threads 50 on the bulkhead 28 so that the inner surface of the lock ring contacts the seat (not shown) inside the end of the pressure vessel 22. After the bulkheads 28, 30 and the card cage assembly 40 are inserted into the pressure vessel 22, the bulkheads are welded to the pressure vessel to form an enclosed pressure vessel.

Figure 3:
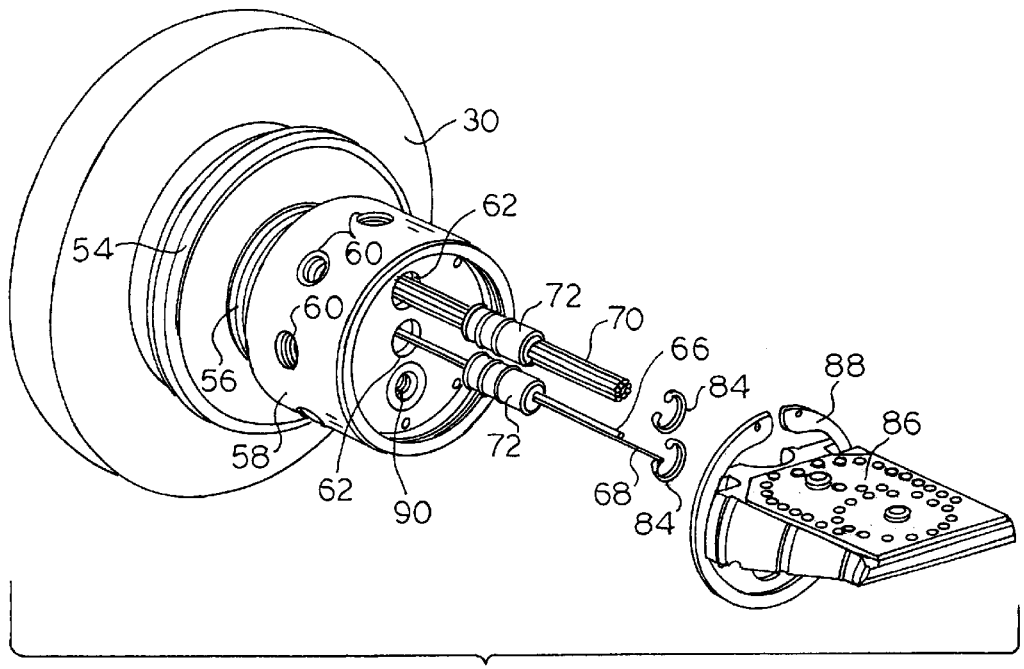
FIG. 3 is a close-up exploded view of a bulkhead assembly for use with the electronics pressure vessel assembly as shown in FIG. 2.

A close-up view of the larger bulkhead 30 is shown in FIG. 3. The outward extension 48 includes three portions of varying diameter, including a large externally threaded portion 54, a small intermediate portion 56 having external circumferential grooves, and a distal housing 58 having circumferentially-spaced threaded openings 60. The bulkheads 28, 30 electrical power lines 66, fiber optic cable 68 are provided with axial openings 62 which allow them to pass signal transmission elements 64 in the signal cable 24, such as telecommunication lines 70, and the like, into the pressure vessel 22.

Figure 4:
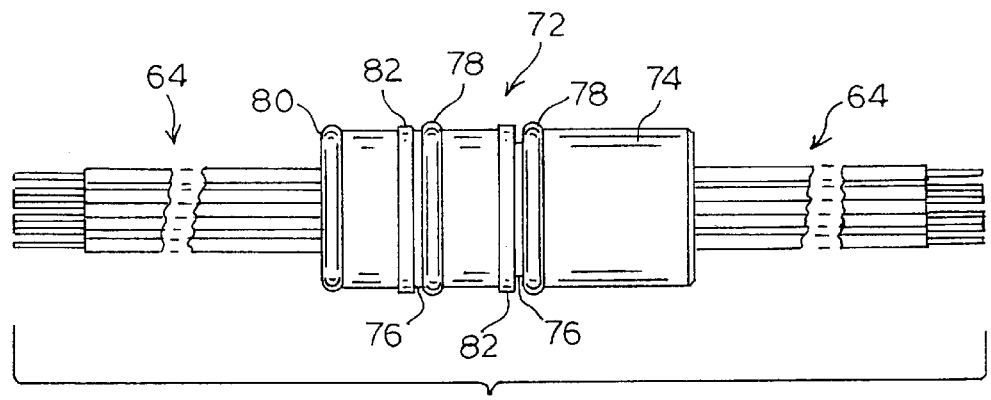
FIG. 4 is a close up view of a cable seal for use in the present invention.

According to the present invention, the openings 62 into the pressure vessel 22 are protected against moisture penetration using seals 72. As seen in FIG. 4, the seal comprises a cylindrical body 74 formed to correspond to the size of the outer end of the bulkhead openings 62. The seal 72 is formed from a thermal setting polymeric material such as an epoxy resin or cross-linked polymer, for example, a cross-linked elastic polymer. The seals 72 are formed by casting the transmission elements 64 in an epoxy base that hardens to provide a strong, non-porous moisture seal around the transmission elements 64. Short lengths of transmission elements 64 extend out from the ends of the seal 72 for connection to components of system. The formed epoxy seal 72 has three, spaced annular grooves 76 for holding two radial o-rings 78 and one face-seal o-ring 80, respectively. Back-up rings 82 fit in two of the radial seal grooves 76 of the epoxy seal -to prevent extrusion of the radial o-rings 78 at high pressure and also compensate for loose tolerance in the bulkhead openings 62.

Referring to FIG. 5, the epoxy seals 72 are slid into the outer end of the bulkhead openings 62 for introducing the transmission elements 64 through the openings and into the pressure vessel 22 where the transmission elements may be connected to the electrical components. Insertion depth of the seals 72 into the bulkhead 30 is limited by the depth of a larger diameter outer bore of the openings 62. The seals 72 are positively secured within the bores by retaining c-clips 84. so that the face seal o-ring 80 engages the bottom of the bore. The radial o-rings 78 seal the periphery of the epoxy seal 72 against the inner surface of the bore to provide a fluid tight seal that prevents any fluid from reaching the interior of the pressure vessel 22. The transmission element 64 ends from the outer end of the seal 72 extends externally of the bulkhead 30. A fiber splice tray 86 (FIG. 3) is attached in bulkhead housing 58 using a c-clip 88 when necessary for splicing fiber optic cable.

A third axial opening 90 in the bulkhead is provided for vacuum evacuation of the pressure vessel 22 and for filling the evacuated vessel with nitrogen, as is known in the art Referring now to FIG. 2, cable termination may be accomplished using standard cable termination assemblies 38, which are generally of the cone-in-socket or crimp type. In both types, the termination assembly housing 92 is mechanically fastened to the signal cable 24 end using conventional fastening means for securing the metal strength members in the signal cable 64 to the housing 92. As described above, the termination assembly 38 functions to pass the signal transmission elements 64 while assuming the mechanical stress on the signal cable 24. The termination assembly housing 92 holding the terminal end of the signal cable 24 is designed to prevent the entry of water into the internal portions of the signal cable. A fiber splice tray 94 is provided when necessary for splicing of fiber optic cable.

A carbon steel connector sleeve 96 is provided for connecting the pressure vessel 22 and termination assembly 38.

The ends of the sleeve 96 fit tightly over the termination assembly housing 92 and bulkhead housing 58. The ends of sleeve 96 have circumferentially-spaced holes 98 in the periphery which align with corresponding holes 99 in the termination assembly housing 92 and the holes in the bulkhead housing. The holes in the sleeve 96 receive screws or other fasteners (not shown) for securing the bulkhead housing 58 and the termination assembly 38. When connected, the sleeve 96 houses the optical fiber splice trays assemblies 86, 94 and defines an area where other transmission elements 64 are spliced or branched. The sleeve 96 thus becomes a load bearing member of the pressure vessel assembly 22 to prevent mechanical stress from being applied to the transmission elements 64. Moreover, the signal cable 24 is secured relative to the pressure vessel 22 such that the application of force to pull the cable from the cable termination assembly 38 will not be transmitted to connections between the signal cable transmission elements 64 and electronic components in the pressure vessel 22.

The internal area defined by the cable termination assembly 38, bulkhead housing 58 and sleeve 96 not otherwise occupied is substantially filled with a water blocking compound, such as a polybutene compound, to substantially prevent the entry of moisture into the area and the vessel 22. This is accomplished by providing passages 100 (FIG. 5) at the bottom of the screw holes 60 in the bulkhead housing 58 which open into said area. During assembly, two opposed screw holes 60 are left open and polybutene is added to the area through one hole until the polybutene exits the opposed hole indicating the area is filled.

According to the present invention, a series of heat shrink tubes 102, 104, 106 are used to seal the termination assembly 38. Heat-shrink tubes are known and include, for example, polyolefin polymeric materials with a low shrinking temperature such as the polyolefin marketed under the trade name "Sigmaform" by the Raychem which shrinks completely at a low temperature of about 250 degrees Fahrenheit.

Figure 6:
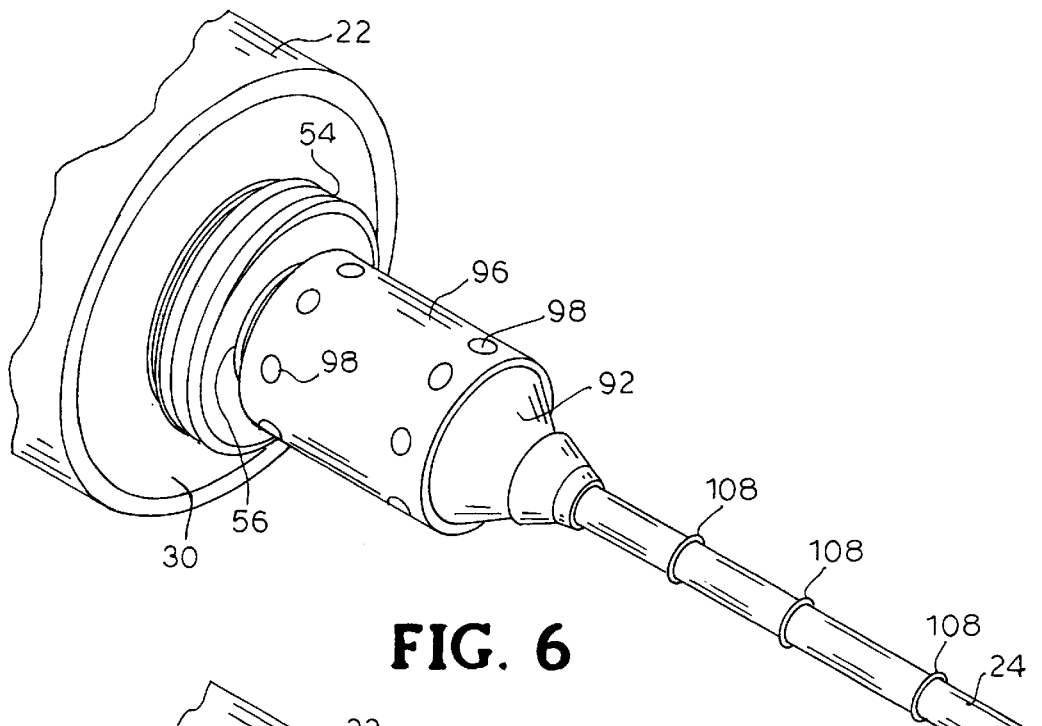
FIG. 6 is a perspective view of a first plurality of o-rings in place along a cable leading into a cable termination assembly.
Figure 7:
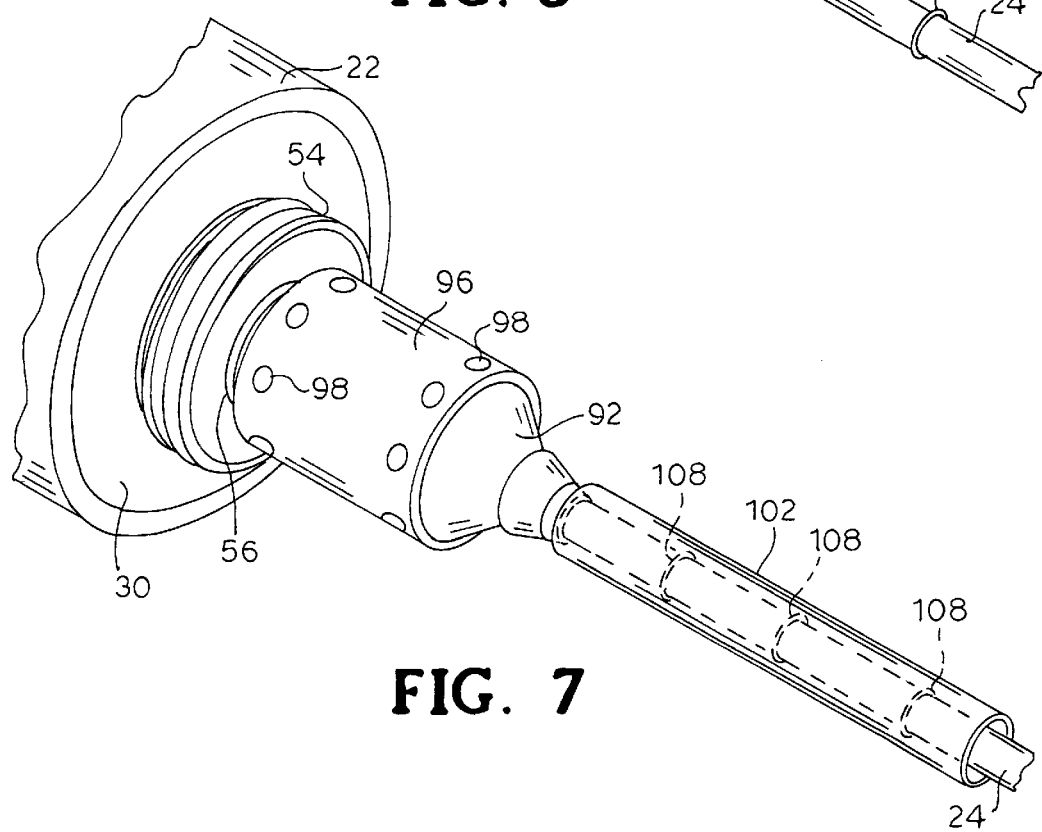
FIG. 7 shows a first heat-shrink tube in place around the first set of o-rings shown in FIG. 6.
Figure 8:
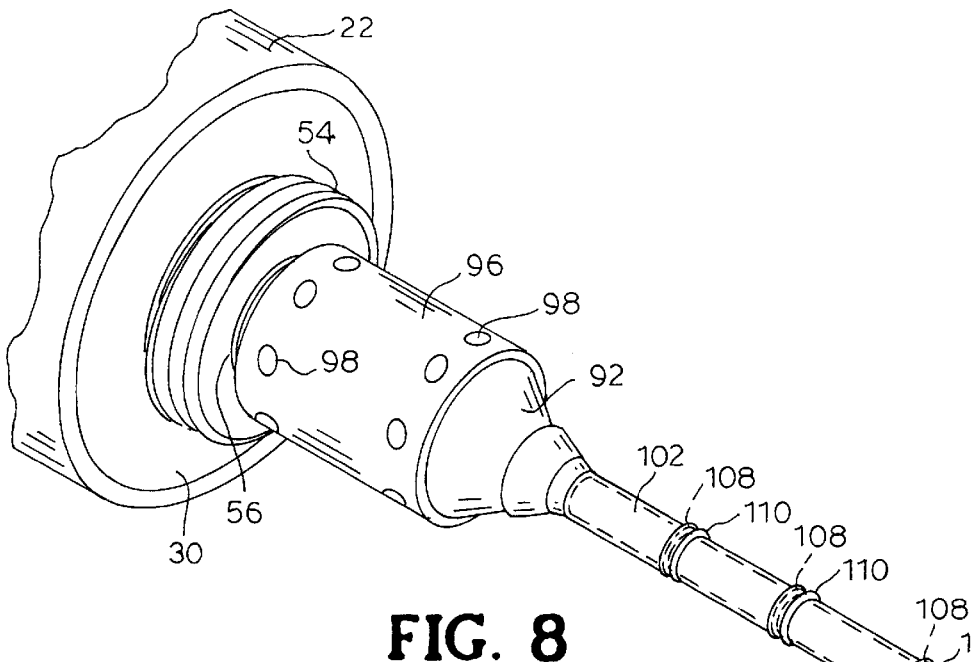
FIG. 8 shows a second set of o-rings in place around the shrunken first heat shrink tube around a cable leading into a termination assembly as shown in FIG. 7.

After the termination assembly 38 is connected through the sleeve 96 to the bulkhead housing 58, a length of cable adjacent the termination assembly housing 92 (FIG. 6) and a portion of the housing 92 are lightly abraded. The abraded surfaces are then cleaned with industrial grade alcohol. A first set of three o-rings 108 is installed along the cable 24 adjacent the housing 92. The first heat-shrink tube 102 is positioned over the o-rings 108 and cable 24 (FIG. 7). The tube 102 is selected to have a slightly greater inside diameter than the outside diameter of the o-rings 108 so that the tube slips easily over the o-rings. One end of the tube 102 seats against the termination assembly housing 92. Preferably, the inside of the tube 102 is coated with an adhesive sealing material which, along with the roughened cable surface, promotes adherence and sealing by the tubing 102. A suitable adhesive is available under the designation "S-1030"— "from the Raychem company. A heat gun (not shown) is used to shrink the diameter of the tube 102 (FIG. 8). The shrinking of the tube 102 causes a portion of an inner surface of the heat-shrinkable tube to come into compressive engagement with the outer jacket of the cable 24 and the o-rings 108 and causes the adhesive to flow providing an excellent water blocking seal even in the presence of high exterior water pressure. The compressive engagement of the tube 102 with the jacket and o-rings 108 also provides a series of redundant seals between a portion of an inner surface of the heat-shrink tube and the signal cable 24 jacket.

Figure 9:
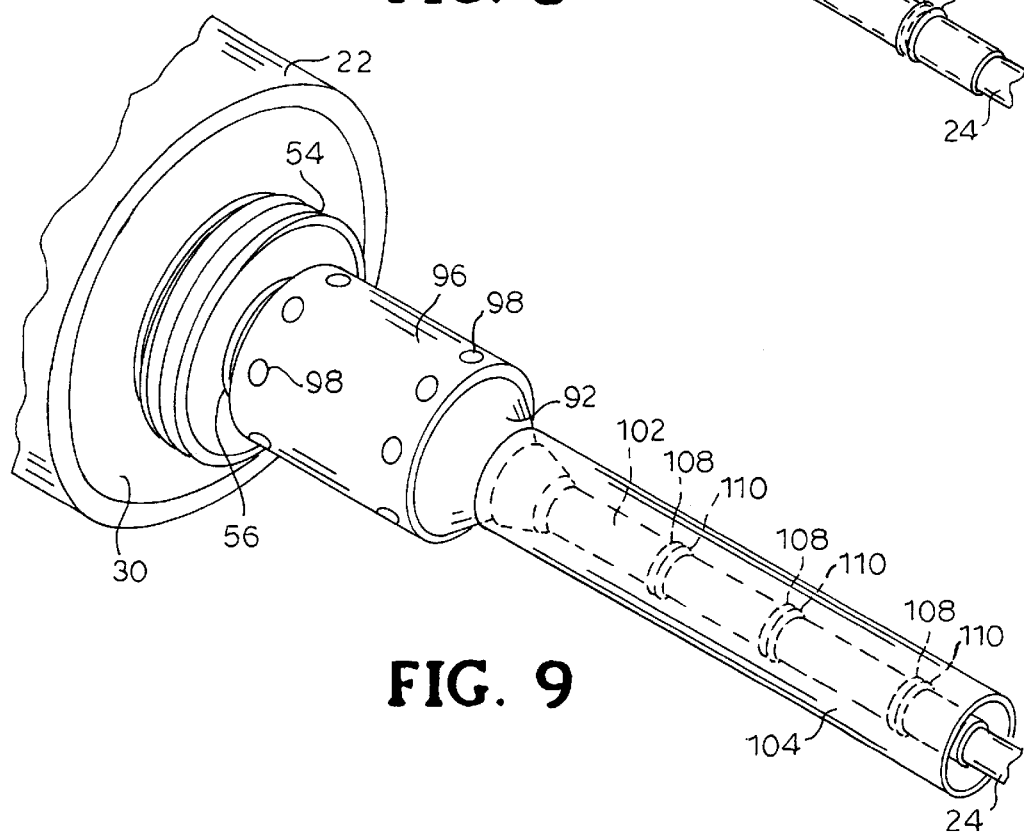
FIG. 9. shows a second heat-shrink tube around the second set of o-rings shown in FIG. 8.
Figure 10:
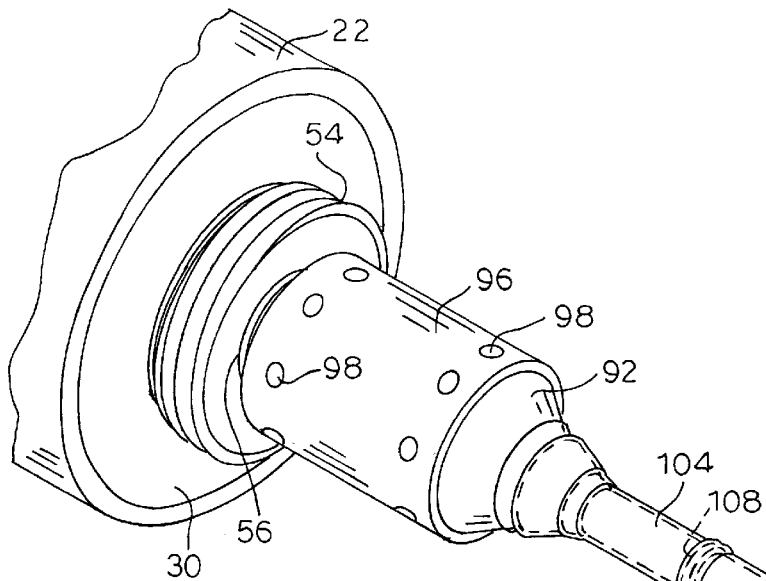
FIG. 10 shows the shrunken second heat-shrink tube around a cable leading into a termination assembly as shown in FIG. 9.

After cooling, the surface of the first heat shrink tubing 102 is abraded to form a rough surface and cleaned with alcohol. As seen in FIG. 8, a second set of three o-rings 110 is installed over the first heat shrink tubing 102 just behind the first three, already-installed o-rings 108. A second, larger heat-shrinkable tube 104 is positioned over the o-rings 110 and cable 24 over a portion of the termination assembly housing 92 (FIG. 9). The preferred length of the second heat-shrink tube 104 is sufficient to cover the first tube 102. The second tube 104 is heated and shrunk down over the cable 24, and O-rings 110 and housing 92 (FIG. 10). Preferably, the termination assembly housing 92 includes a peripheral flange which is engaged by the shrunken tube 104 for sealing the end of the tube 104 around the housing 92.

Figure 11:
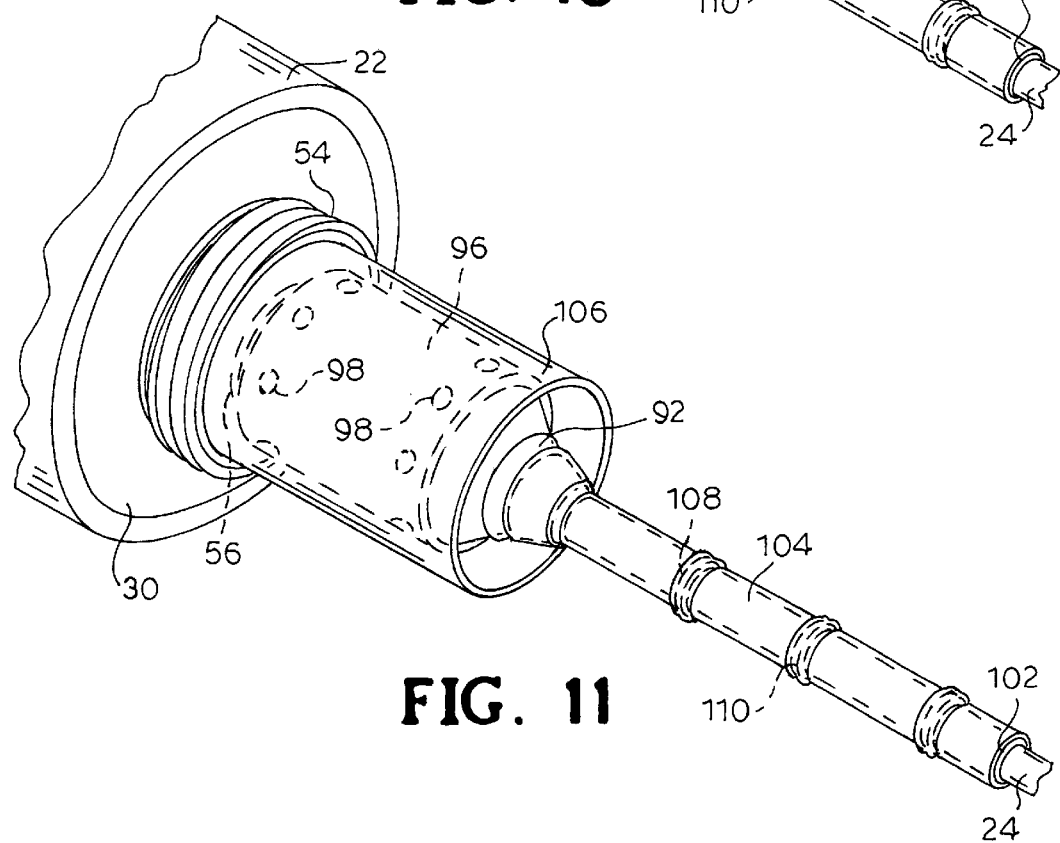
FIG. 11 shows a third heat-shrink tube positioned around a cable termination housing as shown in FIG. 10.
Figure 12:
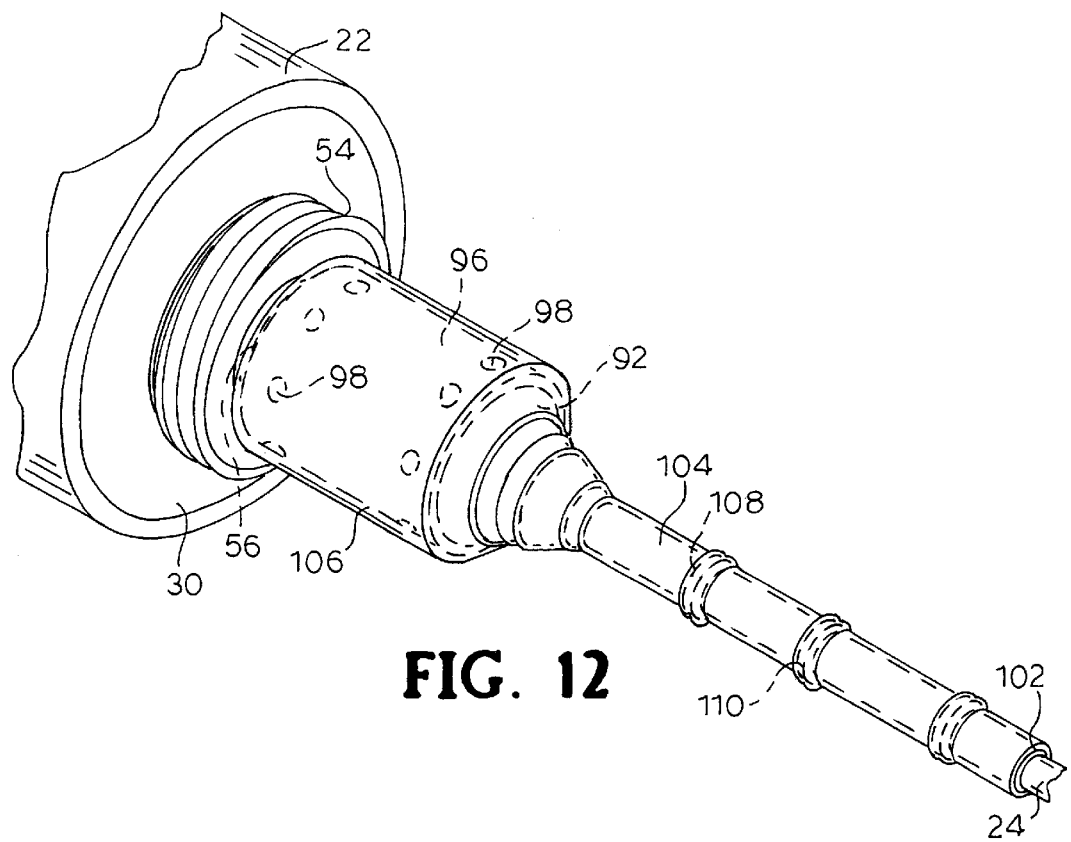
FIG. 12 shows the shrunken third heat-shrink tube around the cable termination housing as shown in FIG. 11.
Figure 13:
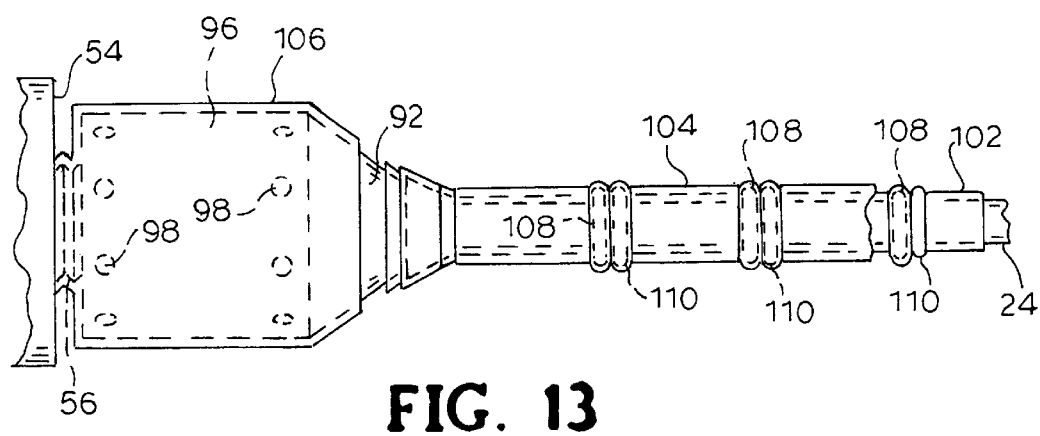
FIG. 13 is a side elevational view partially cut-away of the sealed cable termination assembly shown in FIG. 12.
Figure 14:
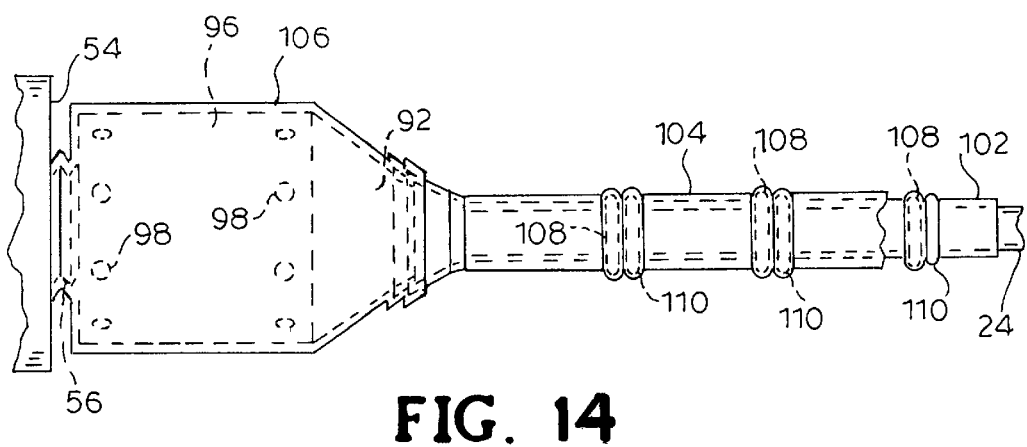
FIG. 14 is side elevational view partially cut-away of another embodiment of a sealed cable and cable termination assembly.

As seen in FIG. 11, a third heat-shrinkable tube 106 is then placed over the sleeve 68 and portions of the bulkhead housing 58 and termination assembly housing 92 and shrunk into place (FIG. 12). The shrunken tube 106 engages the series of grooves provided around the intermediate portion 56 of the axial extension of the bulkhead 30 for sealing the corresponding end of the tube 106. The third heat-shrink tube seal works to keep moisture from the area in the sleeve 96 and to retain the polybutene in the sleeve 96.

The rubber bend strain 26 relief is attached to each bulkhead 28, 30 to protect the signal cable 24 from being bent at a radius that could damage the cable. The bend strain relief 26 (FIG. 2) has a profiled passage extending therethrough for passing the cable 24. The profiled passage has a forward bore 112 which is sized to accept the termination assembly 38. The end of the bend strain relief 26 holds a metal ring 114 which is internally threaded to cooperate with the external threads of the larger portion 54 of the bulkhead extension 48 to close and seal the end of the pressure vessel assembly 20

Moisture ingress barriers to the electronics within the pressure vessel 22 are provided by the heat-shrinkable tubing 102, 104, 106, o-rings 108, 110, the water-excluding polybutene compound, and the epoxy seals 72. Thus, the electrical components are enclosed inside a watertight pressure vessel assembly 20 with all points of possible moisture entry sealed at several levels by mechanical and fluid seals.

The pressure vessel assembly, due to the aluminum coating, of the present invention is particularly effective in shallow water, or "splash zones", where the oxygen content of seawater is high. However, since deep, oxygen-poor seawater corrodes steel only at a rate of 0.004" per year, a vessel made according to the present invention is adequate for long life applications beyond 20 years.

The pressure vessel and cable termination assembly seals of the present invention thus provide a reliable, durable pressure vessel assembly for housing electronic components in the underwater environment. Moreover, the materials and production methods used result in inexpensive pressure vessels. Specifically, reduced product costs are realized by replacing the beryllium copper material used for conventional pressure vessels and bulkheads with carbon steel, thereby reducing costs on the order of about ten to one. Also, there are no safety hazards in working with the carbon steel, as opposed to beryllium copper. Epoxy cable seals described herein are about one fourth the cost of Bridgman-type seals and installation is more reliable. The use of heat-shrinkable tubing to seal the termination assemblies eliminates the need for costly, specialized capital equipment for polyethylene molding and reduces manufacturing time. Generally, manufacturing and assembly of the pressure vessel assembly of the present invention are less costly, less complex, require lower skill levels, and are less time-consuming than present pressure vessels. The manufacturing process of the pressure vessel assembly removes process dependent characteristics inherent with present pressure vessels by providing a more robust, repeatable product.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, the cable termination assembly seal and method may be used to seal the passage of any cable into a cable-receiving structure. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. A cable seal for sealing the passage of a cable into a cable-receiving structure, the cable including an outer surface, the cable seal comprising:
   a first plurality of o-rings adapted to be disposed along a length of the cable adjacent the cable-receiving structure;
   a first length of heat-shrinkable tube adapted to fit over the cable and o-rings adjacent the cable-receiving structure for compressive engagement with the cable and o-rings when the first tube is heated to prevent moisture penetration between an inner surface of the first tube and the outer surface of the cable;
   a second plurality of o-rings disposed over the first heat-shrinkable tube, the second plurality of o-rings positioned adjacent the first plurality of o-rings; and
   a second length of heat-shrinkable tube adapted to fit over the second plurality of o-rings, the first heat-shrinkable tube, the first plurality of o-rings, the cable and a portion of the cable-receiving structure for compressive engagement with the second plurality of o-rings, the first heat-shrinkable tube, the first plurality of o-rings, the cable and the portion of the cable-receiving structure when heated to prevent moisture penetration between an inner surface of the second tube and an outer surface of the cable-receiving structure and between the inner surface of the second tube and the outer surface of the cable.

2. A cable seal as recited in claim 1, wherein the inner surfaces of the first and second tubes are coated with an adhesive.

3. A sealed cable end assembly, the cable end assembly comprising
   a cable having a terminal end and an outer surface;
   a structure having a through passage for receiving the cable end, the cable-receiving structure including means for preventing relative axial movement of the structure and cable;
   a first plurality of o-rings adapted to be disposed along a length of the cable adjacent the cable-receiving structure;
   a first length of heat-shrinkable tube positioned around the cable and o-rings adjacent the cable-receiving structure for compressive engagement with the cable and o-rings when the first tube is heated to prevent moisture penetration between an inner surface of the first tube and the outer surface of the cable;
   a second plurality of o-rings disposed over the first heat-shrinkable tube, the second plurality of o-rings positioned adjacent the first plurality of o-rings; and
   a second length of heat-shrinkable tube positioned around the second plurality of o-rings, the first heat-shrinkable tube, the first plurality of o-rings, the cable and the portion of the cable-receiving structure for compressive engagement with the second plurality of o-rings, the first heat-shrinkable tube, the first plurality of o-rings, the cable and a portion of the structure cable when heated to prevent moisture penetration between an inner surface of the second tube and an outer surface of the portion of the structure and between a portion of the inner surface of the second tube and the outer surface of the cable.

4. A cable seal as recited in claim 3, wherein the inner surfaces of the first and second tubes are coated with an adhesive.

5. A cable seal as recited in claim 3, wherein the periphery of the outer surface of the portion of the cable-receiving structure further comprises a raised lip so that the second heat-shrinkable tube compressively engages the lip when heated.

6. A method for sealing a cable termination, the cable termination including a structure having an opening for receiving a cable end and preventing relative axial movement of the cable end and structure, the cable termination sealing method comprising the steps of:
   disposing a first plurality of o-rings along a length of the cable adjacent the cable-receiving structure;
   positioning a first length of heat-shrinkable tube around the cable and o-rings;
   heating the first heat-shrinkable tube causing the tube to compressively engage the cable and o-rings to prevent moisture penetration between an inner surface of the first tube and the outer surface of the cable;
   disposing a second plurality of o-rings disposed around the first heat-shrinkable tube, the second plurality of o-rings positioned adjacent the first plurality of o-rings;
   positioning a second length of heat-shrinkable tube around the second plurality of o-rings, the first heat-shrinkable tube, the first plurality of o-rings, the cable and a portion of the cable-receiving structure; and
   heating the second heat-shrinkable tube causing the tube to compressively engage the second plurality of o-rings, the first heat-shrinkable tube, the first plurality of o-rings, the cable and a portion of the structure to prevent moisture penetration between an inner surface of the second tube and an outer surface of the portion of the structure and between a portion of the inner surface of the second tube and the outer surface of the cable.

* * * * *